United States Patent
Poe et al.

(10) Patent No.: US 12,216,319 B2
(45) Date of Patent: Feb. 4, 2025

(54) EASILY ACCESSIBLE FIBER OPTIC PANEL ASSEMBLY

(71) Applicant: Google LLC, Mountain View, CA (US)

(72) Inventors: Charles Poe, Palo Alto, CA (US); Mathew Berg, Charleston, SC (US)

(73) Assignee: Google LLC, Mountain View, CA (US)

( * ) Notice: Subject to any disclaimer, the term of this patent is extended or adjusted under 35 U.S.C. 154(b) by 205 days.

(21) Appl. No.: 17/694,811

(22) Filed: Mar. 15, 2022

(65) Prior Publication Data

US 2023/0258896 A1 Aug. 17, 2023

Related U.S. Application Data

(60) Provisional application No. 63/310,199, filed on Feb. 15, 2022.

(51) Int. Cl.
G02B 6/00 (2006.01)
G02B 6/44 (2006.01)

(52) U.S. Cl.
CPC ......... G02B 6/4452 (2013.01); G02B 6/4455 (2013.01)

(58) Field of Classification Search
CPC ............... G02B 6/4452; G02B 6/4455; G02B 6/44526; G02B 6/00
See application file for complete search history.

(56) References Cited

U.S. PATENT DOCUMENTS

| | | | |
|---|---|---|---|
| 5,142,597 A | 8/1992 | Mulholland et al. | |
| 5,647,043 A | 7/1997 | Anderson et al. | |
| 5,687,268 A | 11/1997 | Stephenson et al. | |
| 6,364,537 B1 | 4/2002 | Maynard | |
| 7,406,240 B2 * | 7/2008 | Murano | G02B 6/475 385/136 |
| 7,418,184 B1 | 8/2008 | Gonzales et al. | |
| 8,452,148 B2 | 5/2013 | Cooke et al. | |
| 8,676,022 B2 | 3/2014 | Jones | |
| 8,747,150 B1 | 6/2014 | Lin | |
| 9,128,255 B2 | 9/2015 | Sato | |

(Continued)

FOREIGN PATENT DOCUMENTS

| | | |
|---|---|---|
| CN | 101820121 A | 9/2010 |
| CN | 104081241 A | 10/2014 |

(Continued)

OTHER PUBLICATIONS

Extended European Search Report for European Patent Application No. 20210632.4 dated May 4, 2021. 9 pages.

(Continued)

*Primary Examiner* — Jennifer Doan
(74) *Attorney, Agent, or Firm* — Lerner David LLP

(57) ABSTRACT

A fiber optic panel assembly that includes one or more sliding trays disposed therein is provided. The sliding trays may slide out certain selected adaptor modules outward from other non-selected fiber optic modules in a vertical fashion is provided. In one example, the fiber optic panel assembly includes a ceiling, a bottom cover, and two opposing side panels defining an interior opening therein, and a curved support plate disposed in the interior opening of the fiber optic panel assembly, wherein the curved support plate has a plate body having a plurality of apertures, each aperture is configured to receive a respective adaptor.

14 Claims, 12 Drawing Sheets

(56) References Cited

U.S. PATENT DOCUMENTS

| | | | |
|---|---|---|---|
| 9,223,106 B2* | 12/2015 | Coan | G02B 6/4457 |
| 9,268,103 B2 | 2/2016 | Nguyen et al. | |
| 9,429,251 B1 | 8/2016 | Lin | |
| 9,465,172 B2 | 10/2016 | Shih | |
| 9,625,658 B1 | 4/2017 | Lin | |
| 10,228,516 B2 | 3/2019 | Veatch et al. | |
| 10,564,378 B2 | 2/2020 | Cooke et al. | |
| 10,871,619 B2 | 12/2020 | Ninomiya et al. | |
| 2001/0026661 A1 | 10/2001 | de Jong et al. | |
| 2009/0067800 A1 | 3/2009 | Vazquez et al. | |
| 2009/0245743 A1 | 10/2009 | Cote et al. | |
| 2010/0032276 A1 | 2/2010 | Arai | |
| 2010/0278498 A1 | 11/2010 | Zimmel | |
| 2011/0267794 A1 | 11/2011 | Anderson et al. | |
| 2013/0183018 A1 | 7/2013 | Holmberg | |
| 2014/0003782 A1 | 1/2014 | Blackwell, Jr. et al. | |
| 2014/0003783 A1 | 1/2014 | Smrha et al. | |
| 2014/0226946 A1 | 8/2014 | Cooke et al. | |
| 2015/0078710 A1 | 3/2015 | Sato | |
| 2015/0098698 A1 | 4/2015 | Kewitsch | |
| 2015/0293311 A1 | 10/2015 | Coffey et al. | |
| 2016/0252694 A1* | 9/2016 | Sadasivan | G02B 6/445 385/135 |
| 2016/0327768 A1 | 11/2016 | Xu et al. | |
| 2017/0010432 A1 | 1/2017 | Xu et al. | |
| 2017/0205586 A1 | 7/2017 | Chang et al. | |
| 2017/0248762 A1 | 8/2017 | Sato | |
| 2018/0217338 A1 | 8/2018 | Takano et al. | |
| 2019/0243083 A1 | 8/2019 | Ninomiya et al. | |
| 2019/0271816 A1 | 9/2019 | Wong et al. | |
| 2019/0339465 A1 | 11/2019 | Murray et al. | |
| 2020/0386967 A1 | 12/2020 | Ninomiya et al. | |

FOREIGN PATENT DOCUMENTS

| | | |
|---|---|---|
| CN | 203981920 U | 12/2014 |
| CN | 106980157 A | 7/2017 |
| TW | M487444 U | 10/2014 |
| WO | 2013109469 A1 | 7/2013 |

OTHER PUBLICATIONS

Extended European Search Report for European Patent Application No. 20211893.1 dated Aug. 2, 2021. 10 pages.
Office Action for Chinese Patent Application No. 202011056877.4 dated Oct. 19, 2021. 12 pages.
Partial European Search Report for European Patent Application No. 20211893.1 dated Apr. 30, 2021. 11 pages.
Reference number list for U.S. Patent Application Publication No. 2019/0243083 of Ninomiya et al. (Ninomiya) (Year: 2021).
Reference number list for U.S. Appl. No. 16/893,721 of Poe et al. (Poe, the present application) (Year: 2021).
Reference number list for U.S. Pat. No. 6,364,537 of Maynard (Maynard) (Year: 2021).
International Search Report and Written Opinion for International Application No. PCT/US2022/032803 dated Oct. 11, 2022. 14 pages.
International Preliminary Report on Patentability, Written Opinion Of The International Searching Authority, International Application No. PCT/US2022/032803 dated Aug. 20, 2024, 8 pages.

* cited by examiner

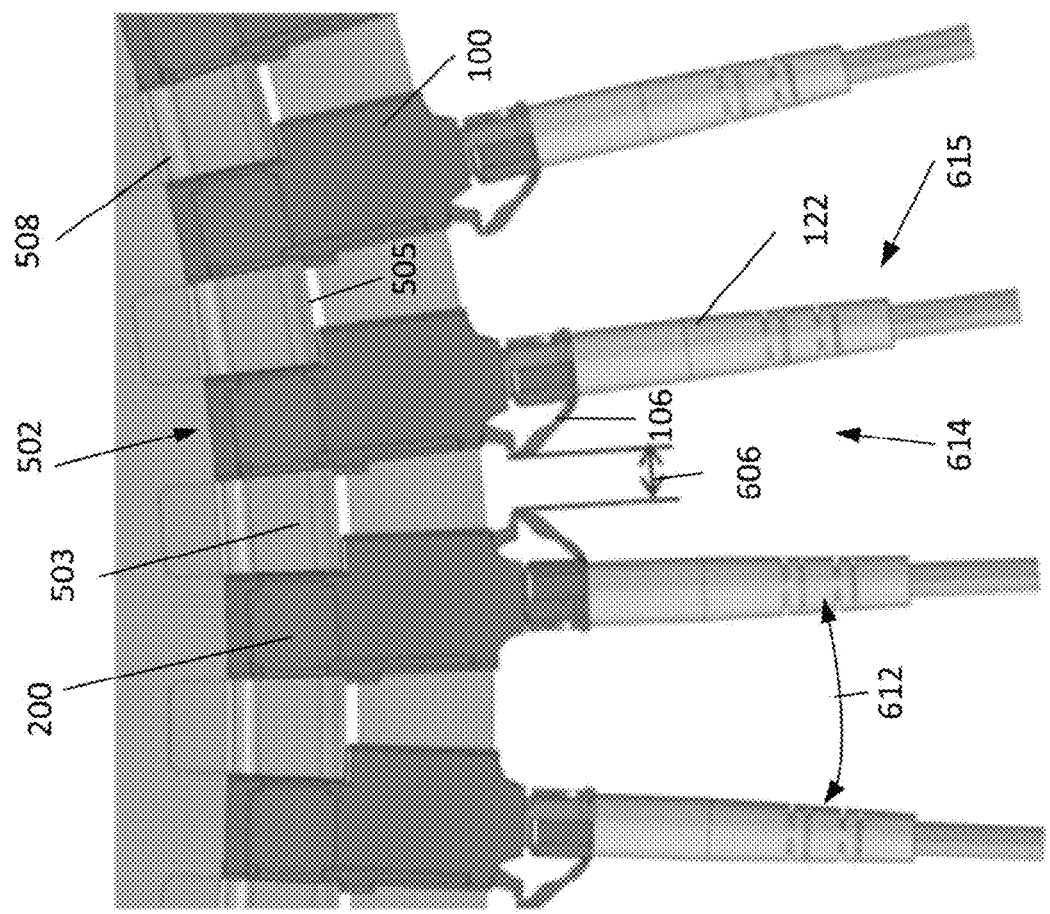
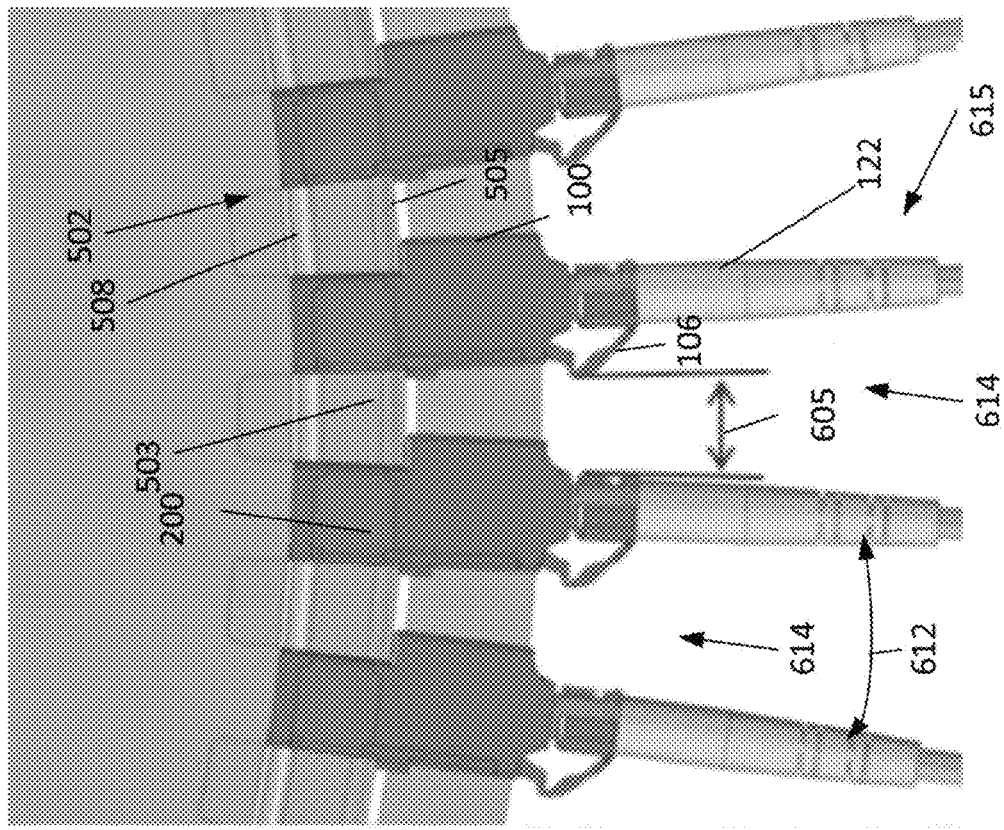
FIG. 6A
FIG. 6B

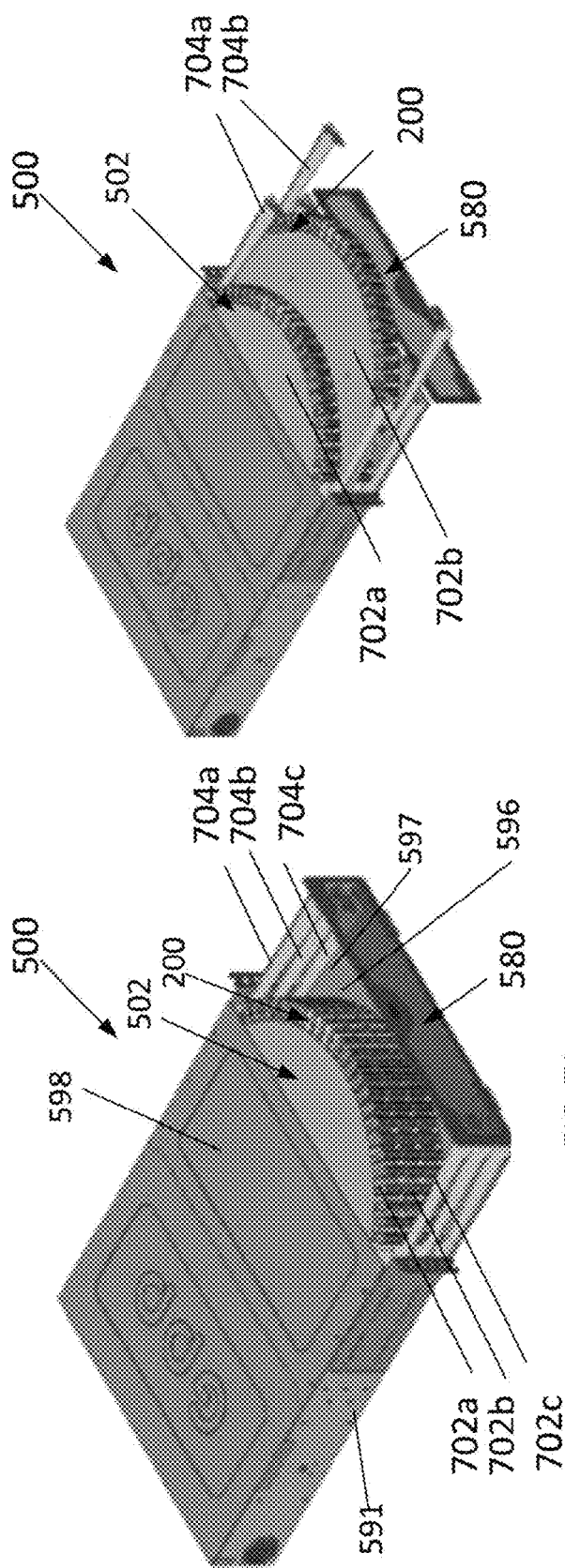
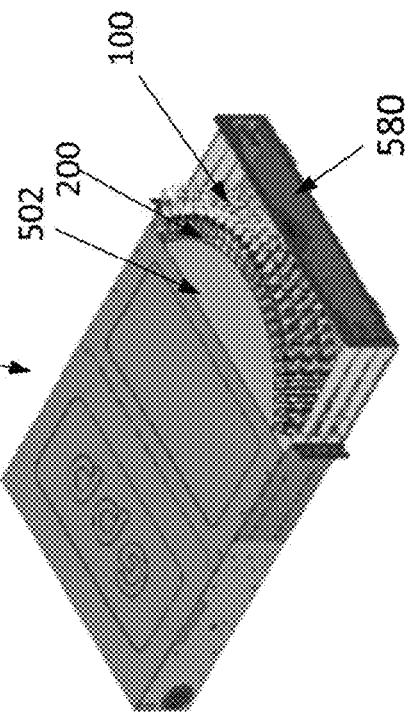
FIG. 7A
FIG. 7B
FIG. 7C

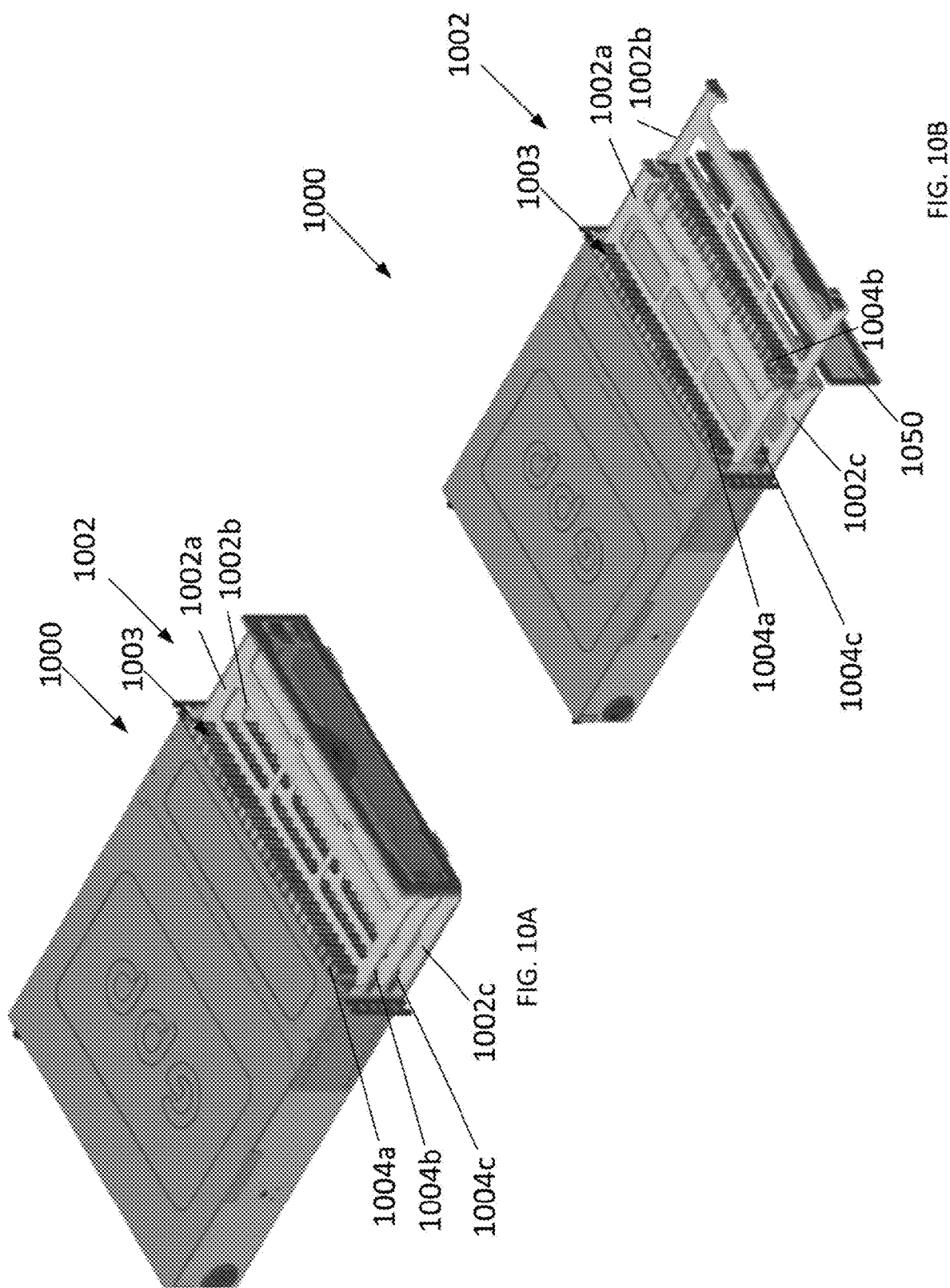

EASILY ACCESSIBLE FIBER OPTIC PANEL ASSEMBLY

CROSS-REFERENCE TO RELATED APPLICATIONS

The present application claims the benefit of the filing date of U.S. Provisional Patent Application No. 63/310,199 filed Feb. 15, 2022, the disclosure of which is hereby incorporated herein by reference.

BACKGROUND

The capabilities of fiber optic connectors, fiber optic cable and fiber optic hardware have been continuously advanced to meet the demands of increasing numbers of users and high transmission rate requirements. Fiber optic hardware is increasingly being used for a variety of applications, such as data transmission, video, broadband voice and the like. The fiber optic cable, connectors or electrical cables are connected to a fiber optic module mounted in a panel assembly disposed in a cable management rack located in a data distribution center or a server room. The fiber optic module provides cable-to-cable fiber optic connections and manages the polarity of fiber optic cable connections. The fiber optic module is mounted to a tray that may be further mounted to the panel assembly. The tray may be extended from the panel assembly like a drawer to allow technicians or operators to access to the fiber optic components, connectors, or fiber optic cables connected to the fiber optic module without removing the fiber optic module from the panel assembly.

While a higher density connection with an increased number of fiber optic components and connectors in the fiber optic module would help to satisfy increased demand, such higher density connections make it difficult to access the fiber optic components and connectors in the fiber optic modules. Conventional tray pull-out configurations often have cramped spaces among the fiber optic connectors coupled to the panel assembly, resulting in difficult finger access for the operators to remove or arrange the fiber optic connectors in the panel assembly.

BRIEF SUMMARY

A fiber optic panel assembly is provided that includes a curved support plate configured to receive multiple adaptors therein. The adaptors disposed in the curved support plate may receive respective fiber optic connectors and maintain a predetermined distance between each connector. The configuration provides sufficient spaces among the fiber optic connectors for easy finger access by operators, while maximizing the number of the fiber optic connectors in the panel assembly. In one example, the fiber optic panel assembly includes a ceiling, a bottom cover, and two opposing side panels defining an interior opening therein. A curved support plate is disposed in the interior opening of the fiber optic panel assembly. The curved support plate has a plate body having a plurality of apertures, each aperture is configured to receive a respective adaptor.

In one example, a front surface of the plate body has a convex configuration. A rear surface of the plate body is formed opposite to the front surface. The rear surface has a concave configuration. The curved support plate may have a radius in a range between about 150 mm and about 280 mm.

In one example, the curved support plate includes one or more trays formed in the plate body. Each tray is individually slidable relative to a neighboring tray. In one example, the curved support plate further includes a flange portion removably mounted in the side panel of the fiber optic panel assembly. Two edge portions are formed at two ends of the curved support plate. A center portion is formed between the edge portions, wherein the two edge portions define a linear length in a range between about 350 mm and about 550 mm. The liner length has a center point having a distance in a range between about 50 mm and about 250 mm to the center portion of the plate body.

In one example, the adaptors are configured to be disposed in the curved support body in vertical arrays placed side by side against each other. Each array of the adaptors defines a longitudinally vertical plane forming an acute angle relative to another longitudinally vertical plane defined by a neighboring array of the adaptors. The acute angle is in a range between about 1 degree and about 40 degrees.

In one example, the adaptor is configured to receive a dual polarity fiber optic connector. In one example, fiber optic panel assembly includes an openable front cover. The front cover is in an open position when the curved support plate is in an extended position.

Another aspect of the disclosure provides a fiber optic panel assembly including a ceiling, a bottom cover, and two opposing side panels defining an interior opening therein. A curved support plate is disposed in the interior opening of the fiber optic panel assembly. Multiple arrays of adaptors are disposed in a plate body of the curved support plate. Each array of the adaptors forms a longitudinally vertical plane having an acute angle relative to another longitudinally vertical plane defined by a neighboring array of the adaptors.

In one example, the adaptor is configured to receive a dual polarity fiber optic connector. The curved support plate comprises one or more individually slidable trays. The curved support plate is removable from the fiber optic panel assembly.

Another aspect of the disclosure provides a fiber optic panel assembly including a ceiling, a bottom cover, and two opposing side panels defining an interior opening therein. One or more slidable trays are disposed in the interior opening in a vertical fashion. Arrays of vertically stacked adaptors are disposed side by side on each of the slidable trays.

BRIEF DESCRIPTION OF THE DRAWINGS

FIGS. 6A-6B depict an example of fiber optic connectors with different polarities placed in the fiber optic panel assembly of FIG. 5A.

FIGS. 7A-7C depict an example of a fiber optic panel assembly including multiple slidable trays according to aspects of the disclosure.

FIGS. 10A-10B depict another example of a fiber optic panel assembly with slidable trays according to aspects of the disclosure.

DETAILED DESCRIPTION

This disclosure provides a fiber optic panel assembly for fiber optic interconnection. The fiber optic panel assembly includes a curved support plate configured to receive multiple adaptor modules to be disposed therein. The curved support plate may support the adaptor modules in positions spaced apart from each other, thus providing sufficient spaces among the fiber optic connectors that allow finger access for operators or technicians. Thus, the operators or technicians can access the fiber optic connectors with ease and reduced interference from the adjacent fiber optic connectors. The curved support plate may receive and accommodate fiber optic connectors with different polarities while maintaining sufficient space among the fiber optic connectors for inspection and connection management. Furthermore, by utilizing the curved support plate in the fiber optic panel assembly, multiple arrays of adaptor modules may be placed side by side, both horizontally and vertically, in the curved support plate in a closely packed arrangement, thus efficiently utilizing the space in the fiber optic panel assembly to enhance the capacity of the adaptor modules that may be carried in the panel assembly. In addition, the curved support plate may include multiple slidable trays so that each tray may be individually pulled out in an extended position for ease of cable inspection and management.

Figure 1A:
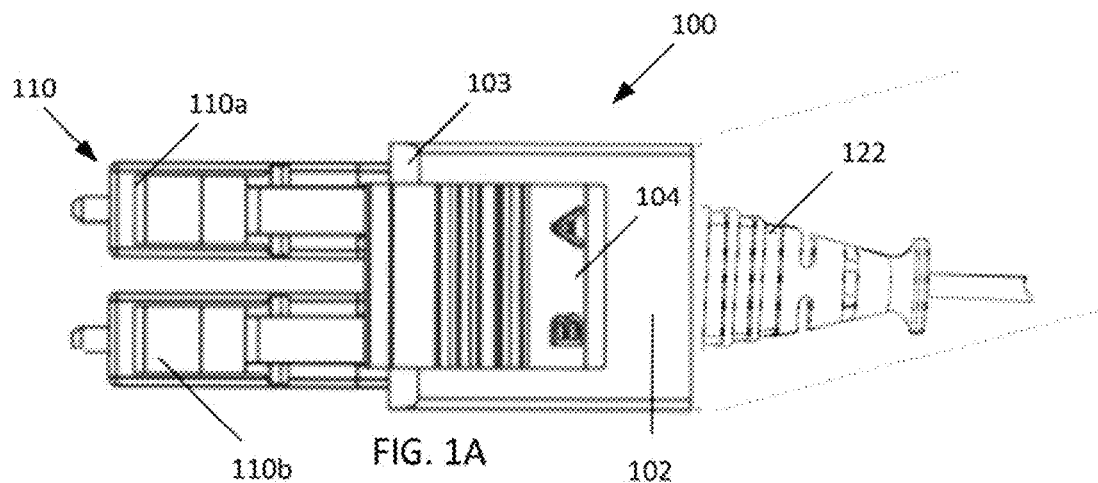
FIGS. 1A-1C depict an example of a fiber optic connector according to aspects of the disclosure.
Figure 1B:
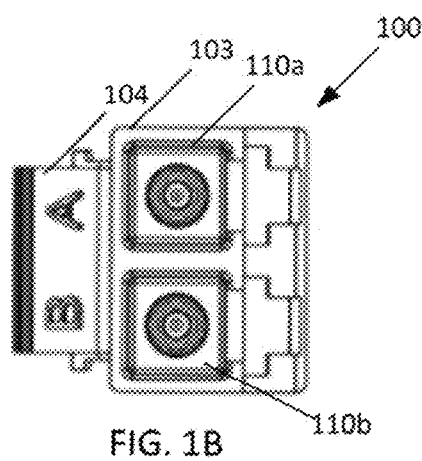
Figure 1C:
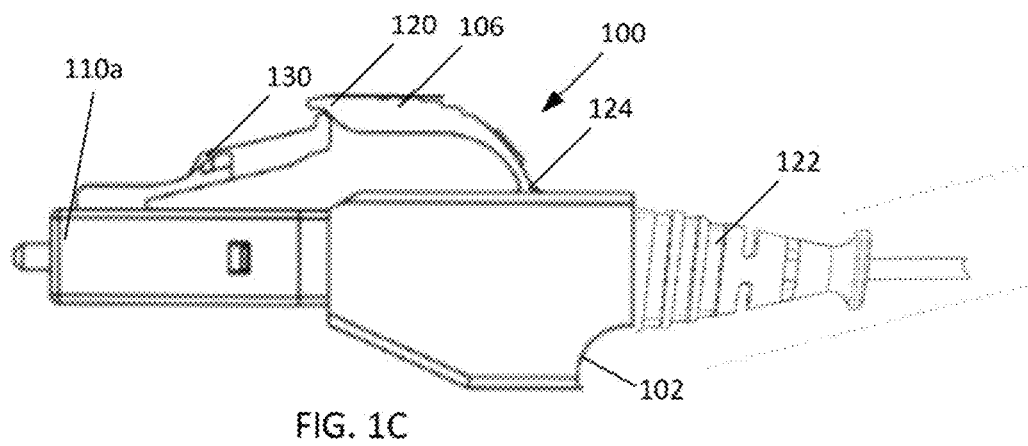

FIGS. 1A-1C depict an example of a fiber optic connector 100 that provides dual polarity configurations. FIG. 1A depicts a top view of the fiber optic connector 100. The fiber optic connector 100 comprises a body 102 that has two connector assemblies 110 (shown as 110a, 110b) connected thereto.

FIG. 1B depicts a front view of the fiber optic connector 100 illustrating the two connector assemblies 110 (shown as 110a, 110b) formed at a front section 103 of the fiber optic connector 100. Connector polarity indicia 104 is formed in the body 102 that indicates the polarity of the connector 100. The body 102 encases two optic fibers connecting to the two connector assemblies 110a, 110b respectively. The two optic fibers enclosed in the body 102 are connected to a cable 122 connected to the body 102.

FIG. 1C depicts a side view of the fiber optic connector 100. A latch 106 has a first end 120 connected to the connector assemblies 110a, 110b through a spring latch arm 130 and a second end 124 connected to the body 102. The latch 106 is used to secure the fiber optic connector 100 to an adaptor. The spring latch arm 130 releasably engages the latch 106. The spring latch arm 130 may be pressed to disengage from the latch 106. When the spring latch arm 130 is released and disengaged from the latch 106, the connector assemblies 110a, 110b may be inserted into an adapter in a predetermined insertion direction. The adaptor may be disposed in a fiber optic panel assembly 300 that may be mounted in a fiber management system. The latch 106 abuts against the spring latch arm 130 connected to the connector assemblies 110a, 110b. When the latch 160 is pressed, it pushes the spring latch arm 130 in a downward direction. Such movement may cause the connector assembly 110a, 110b to disengage from the adapter, such that the connector assembly 110a, 110b can be removed out of the port. When a reversal of the polarity configuration is desired, the spring latch arm 130 may be pressed to discharge the connector assemblies 110a, 110b from the body 102. The connector assemblies 110a, 110b may then be flipped and rotated for 180 degrees for polarity reversal and the latch 106 will then be re-attached to the opposite site of the body 102. Details of the adaptor that may be utilized to mate with the fiber optic connector 100 with dual polarity is illustrated below in detail with references to FIGS. 2A-2B. While in this example operation of the latch 160 can cause disengagement of two connector assemblies 110a, 110b, it should be understood that in other examples the latch can be configured to cause disengagement of additional or fewer connector assemblies. For example, each connector assembly 110a, 110b may be disengaged by operation of a corresponding one of two separate latches.

Figure 2A:
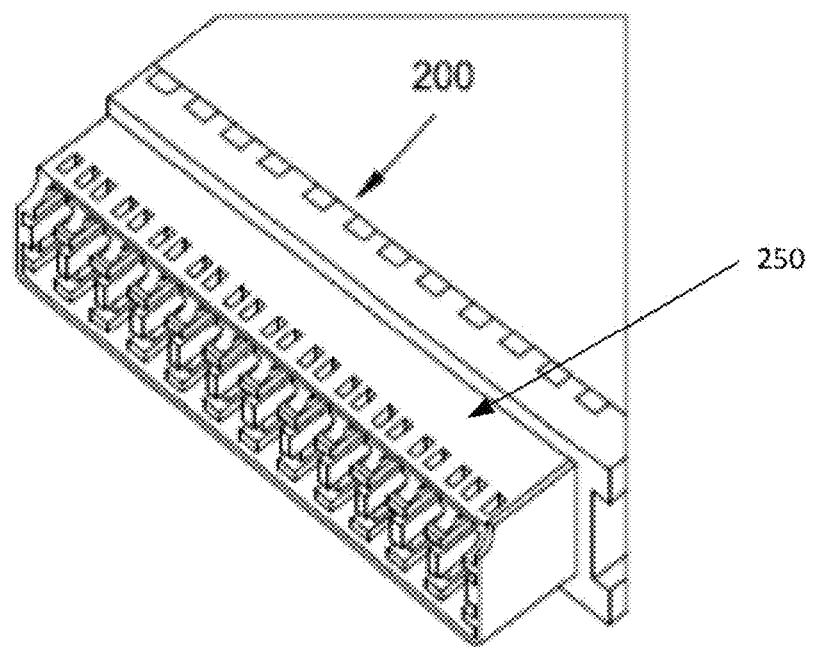
FIG. 2A depicts an example of a fiber optic adaptor module mounted in a chassis according to aspects of the disclosure.
Figure 3:
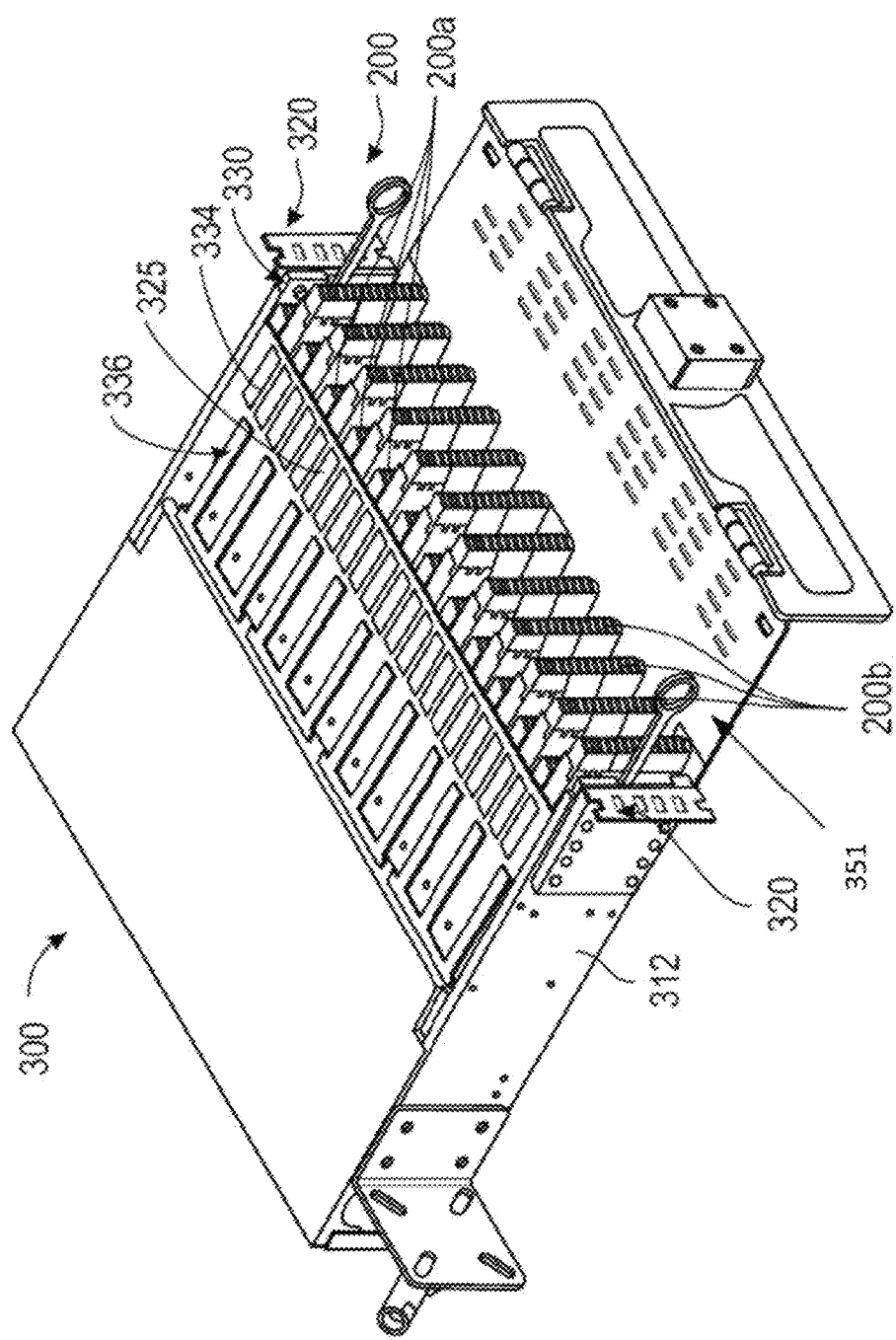
FIG. 3 depicts an example fiber optic panel assembly that may have the fiber optic adaptor modules in a chassis of FIG. 2A-2B mounted therein according to aspects of the disclosure.

FIG. 2A depicts an example of an adaptor module 250 that may be disposed in a fiber optic panel assembly 300, as further depicted in FIG. 3. The adaptor module is configured to hold one or more fiber optic adaptors 200 in place to be disposed in the fiber optic panel assembly 300. The fiber optic adaptor 200 may be mounted inside the adaptor module 250 in the fiber optic panel assembly 300 in a vertical configuration. The fiber optic adaptor 200 may be disposed in a curved support plate 502 (as shown in FIG. 5) that may include one or more trays that may be extendable and slidable outwardly from the fiber optic panel assembly 300 like a drawer to allow technicians access to the fiber optic adaptor 200 and any fiber optic cables, or connectors connected to the fiber optic adaptor 200 without removing the fiber optic adaptor 200 from the fiber optic panel assembly 300. It should be understood that the number of adapters and/or adaptor ports depicted in FIG. 2A is just an example and may be varied for different requirements and configurations. It is noted that multiple fiber optic adaptors 200 may be connected side by side, end to end, in multiple arrays or columns, or any suitable configurations as needed.

Figure 2B:
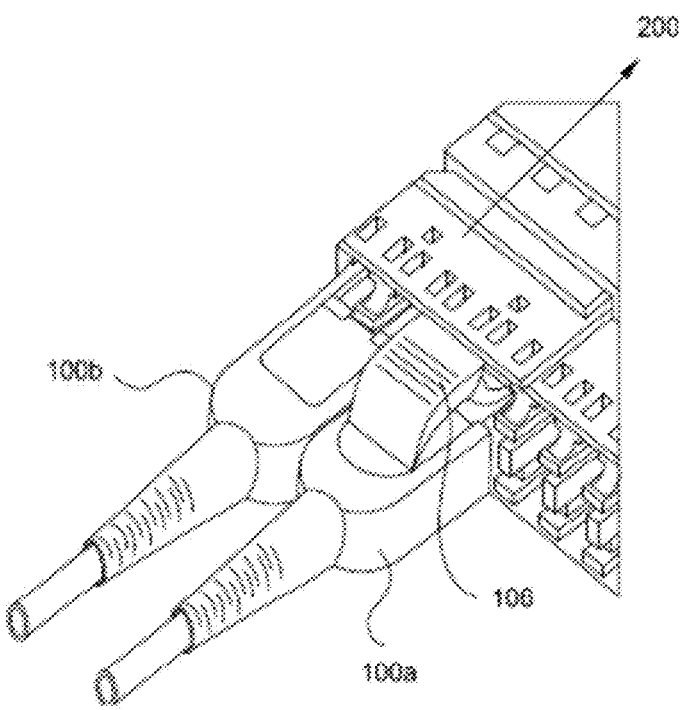
FIG. 2B depicts an example of fiber optic connectors with different polarity configurations connected to the fiber optic adaptor modules in a chassis of FIG. 2A according to aspects of the disclosure.

FIG. 2B depicts an example of the two fiber optic connectors 100a, 100b with different polarity configurations connected to the fiber optic adaptor 200. The fiber optic adaptor 200 is configured to receive fiber optic connectors 100 with different polarities. For example, the two fiber optic connectors 100 with different polarity, such as the first fiber optic connector 100a with the latch 106 positioned upward from the housing and the second fiber optic connector 100b with the latch 106 positioned downward from the housing (not shown in FIG. 2B), may be both engaged in the fiber optic adaptor 200 at the same time.

FIG. 3 depicts an example of a front view of the fiber optic adaptor 200 placed in a patch panel assembly 300 with a ceiling cover 325 installed and covered thereon. The fiber optic adaptor 200 may be disposed in an interior region defined in the patch panel assembly 300. The fiber optic adaptor 200 is disposed vertically in the interior region relative to a horizontal plane defined by the ceiling cover 325 or a bottom cover 351 of the patch panel assembly 300. A mounting structure 320 may be disposed on side panels 312 that can assist mounting the patch panel assembly 300 to a cable management system, such as a cable rack located in the server room or a data center.

A sliding tray 336 may be mounted in the patch panel assembly 300. The sliding tray 336 may be configured such that it is extendable relative to the side panels 312 from the patch panel assembly 300. The sliding tray 336 may carry multiple arrays of adaptors 200 in the adaptor module 250 so as to slide or pull a predetermined set of the adaptors 200, such as a first set of adaptors 200b relative to a second set of the adaptors 200a, outwardly from the ceiling cover 325 of the patch panel assembly 300. Although the example depicted in FIG. 3 has the first set of fiber optic adaptors 200b slightly protruded outward from the second set of fiber optic adaptors 200a, such as in a staggered configuration, the fiber optic adaptors 200 positioned and loaded in the patch panel assembly 300 may be in any of a variety of different configurations. In such staggered configuration, in some examples, the spaces defined between the first and second set of fiber optic adaptors 200b, 200a that are slightly protruded outward from the second set of fiber optic adaptors 200a may not be sufficiently large to allow finger access from the operators or technicians, especially when the latch 106 of the fiber optic connector 100 with different polarities is placed on the same space defined between the first and second sets of fiber optic adaptors 200b, 200a.

Figure 4:
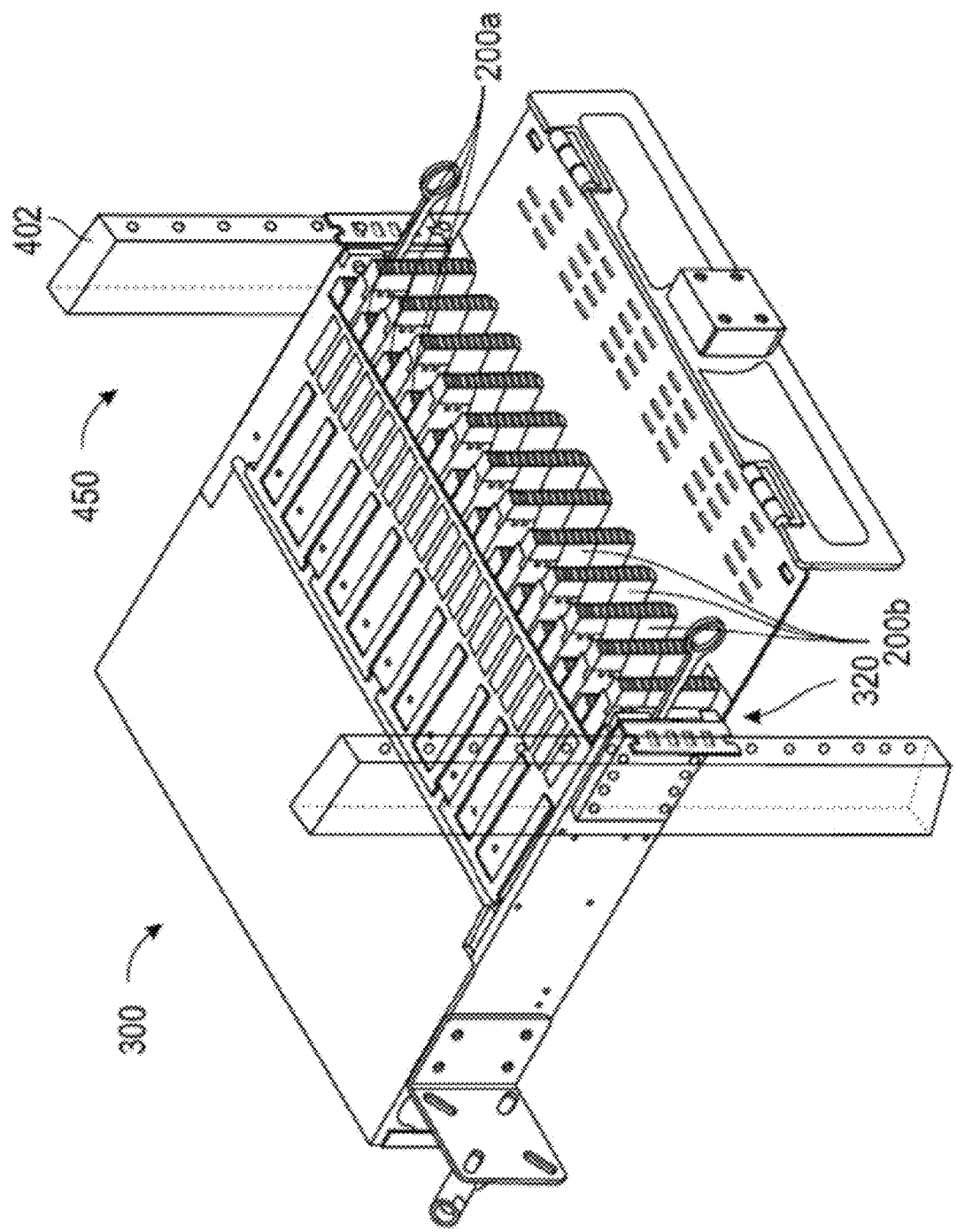
FIG. 4 depicts an example fiber optic panel management system that may have fiber optic panel assembly of FIG. 3 to be mounted thereon according to aspects of the disclosure.

FIG. 4 depicts an example fiber optic cable management system 450 that may have the patch panel assembly 300 of FIG. 3 mounted on a rack 402. After the plurality of fiber optic adaptors 200 are disposed in the patch panel assembly 300, the patch panel assembly 300 may then be mounted on the rack 402 by fastening features, such as bolts, nuts or fastening screws. In some examples, the rack 402 may allow multiple patch panel assemblies 300 mounted thereon in the fiber optic cable management system 450. According to some examples, the patch panel assembly 300 may be mounted in the rack prior to inserting the fiber optic adaptors 200 in the patch panel assembly.

Figure 5A:
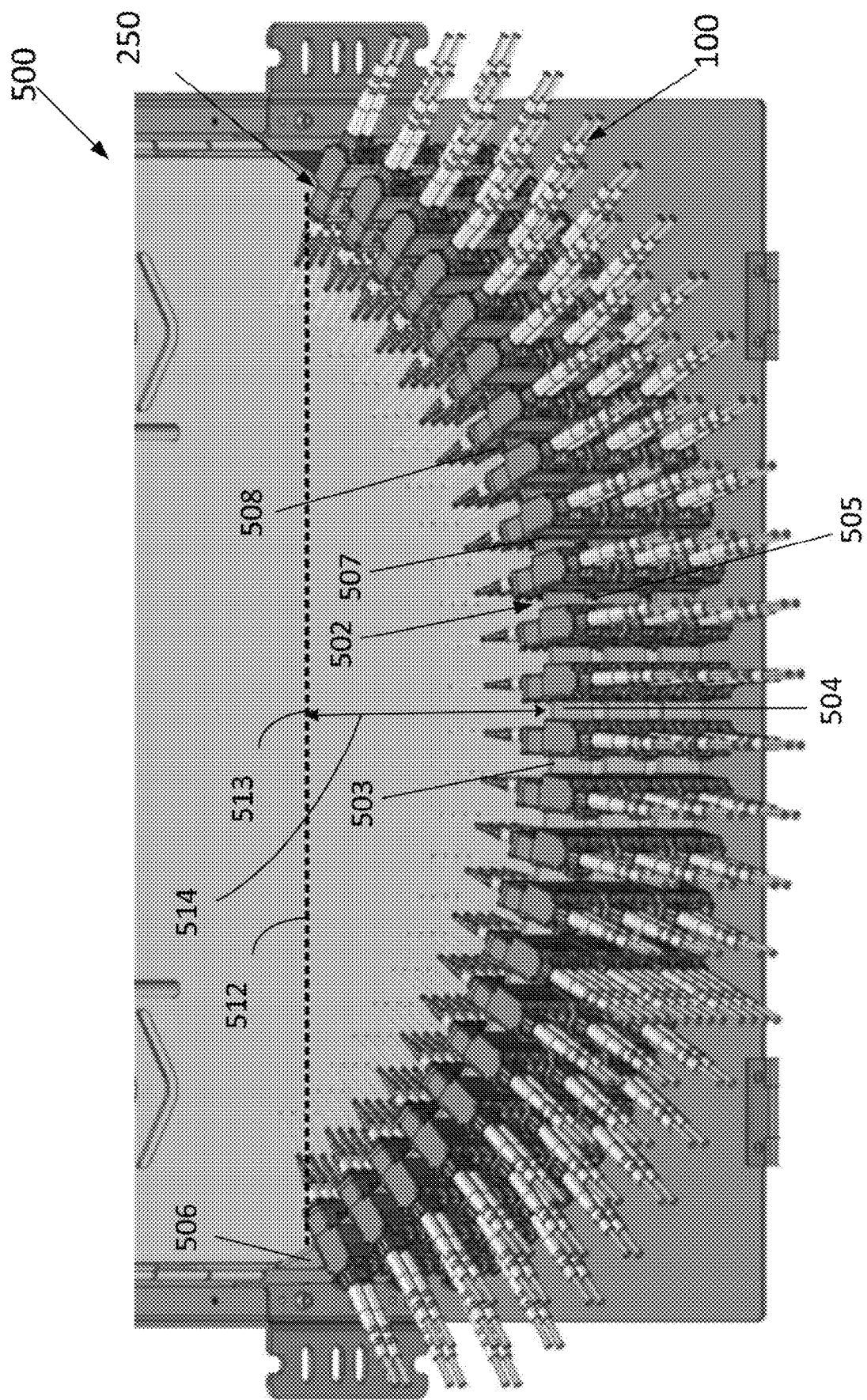
FIGS. 5A-5B depict an example of a curved support plate that may be disposed in a fiber optic panel assembly according to aspects of the disclosure.

FIG. 5A depicts a top schematic view of a curved support plate 502 disposed in a patch panel assembly 500. The curved support plate 502 may be configured to receive multiple adaptors 200, similar to the adaptors 200 depicted in FIG. 2A, to receive fiber optic connectors, such as the fiber optic connectors 100 depicted in FIG. 1. The curved support plate 502 includes a plate body 503 having a center portion 504 and two edge portions 506 formed at two ends of the plate body 503. The plate body 503 may have a front surface 505, a rear surface 508, a top surface 507 and a bottom surface (not shown) defining the plate body 503. The rear surface 508 of the plate body 503 is formed opposite to and in parallel with the front surface 505. The front surface 505 in the center portion 504 protrudes outwardly toward a front cover 580 of the patch panel assembly 500 (as shown in FIG. 7A-7C). The plate body 503 has a curved configuration having the front surface 505 defining a concave surface and the rear surface 508 defining a convex surface, viewing from the side wherein the front cover 580 of the patch panel assembly 500 is located. The curvature of the plate body 503 is selected so that the fiber optic connectors 100 disposed in the adaptors 200 in the curved support plate 502 may have a desired spaced-apart relationship that allows finger access in the space between the fiber optic connectors 100. In one example, the two edge portions 506 located at the two ends of the plate body 503 may define a linear length 512 therebetween. In one example, the length 512 is in a range between about 350 mm and about 550 mm, such as between about 400 mm and about 500 mm. The length 512 may have a center point 513 defining an equal distance from the center point 513 to the respective edge portion 506. The center point 513 to the rear surface 508 of the center portion 504 of the plate body 503 may have a length 514 in a range between about 50 mm and about 250 mm, such as between about 65 mm and about 150 mm.

Figure 5B:
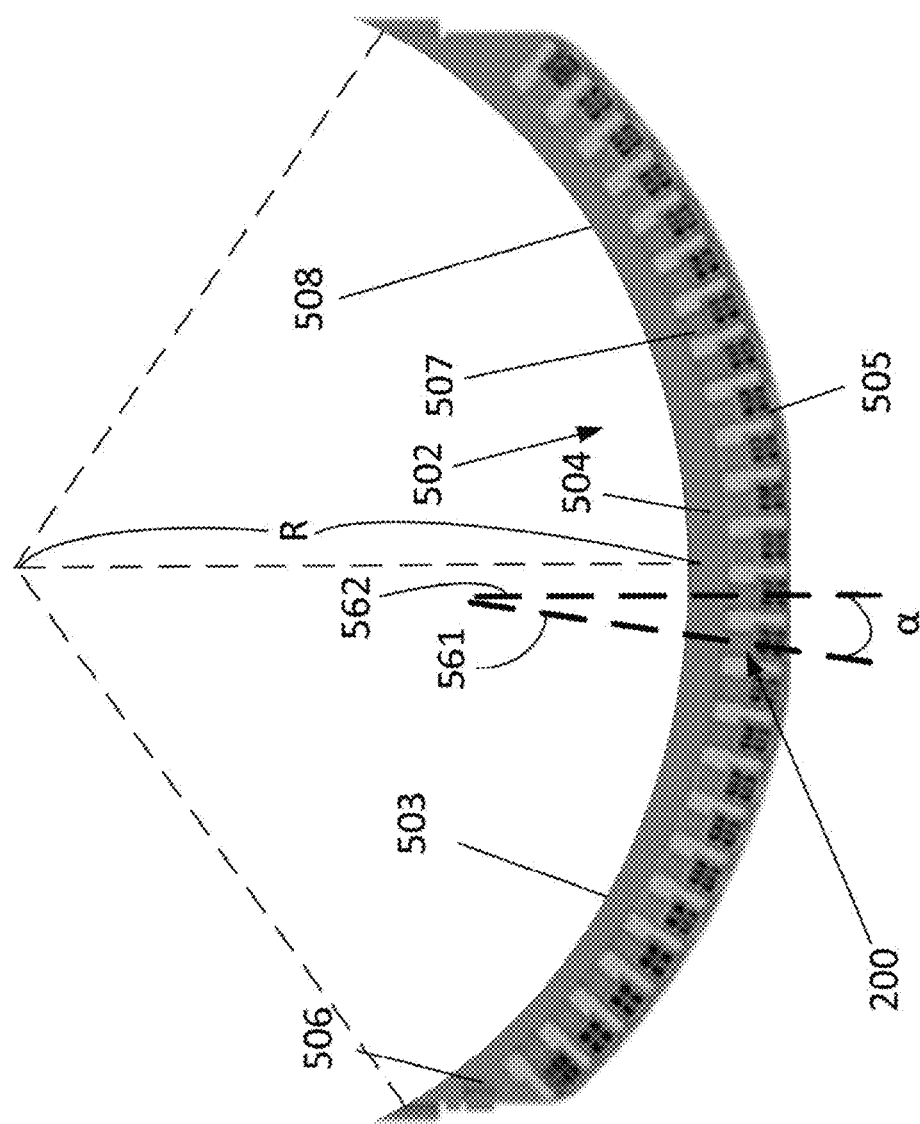

FIG. 5B depicts a stand-alone top view of the curved support plate 502 prior to installing into a patch panel assembly. The curved support plate 502 may have a radius R in a range between about 150 mm and about 280 mm Each array of the adaptors 200 may define a longitudinally vertical plane 561, 562. A longitudinally vertical plane 561 forms an acute angle α relative to a neighboring longitudinally vertical plane 562 due the curvature provided from the curved support plate 502 where arrays of the adaptors 200 are mounted to. In one example, the acute angle α is in a range between 1 degree and about 40 degrees, such as between about 2 degrees and about 25 degrees, for example between about 2.5 degrees and about 15 degrees. The curved configuration of the curved support plate 502 provides the front surface 505 in a flared-out configuration, such as a convex surface, so as to increase the dimension of the space defined between the connectors 100 disposed in the adaptor 200. For example, as depicted in FIGS. 6A-6B, the fiber optic connectors 100 may be disposed in the curved support plate 502 having a predetermined space 614 defined therebetween. The dimension of the space 614 as formed may be associated with the acute angle α defined between the longitudinally vertical planes 561, 562, such as the degrees of the curvature formed in the curved support plate 502. The flared-out configuration of the front surface 505 formed in the curved support plate 502 allows the space 614 defined between the connectors 100 having a relatively wider dimension 612 between the cables 122 of the connectors 100, as compared to a relatively narrower dimension 605, 606 between the latches 106 of the connectors 100. The non-uniform dimensions of the space 614 defined between the connectors 100 allow finger access for the operators to grip on the latches 106 of the fiber optic connectors 100 to release and remove the fiber optic connector 100 from the adaptor 200. In the example depicted in FIG. 6A, the polarities of the fiber optic connectors 100 may be in the same configuration so that the latch 106 may be placed on the same side of the neighboring connectors 100 separating from each other by the cable 122. In contrast, in the example depicted in FIG. 6B, the polarities of the connectors 100 is configured in reversed configurations so that the latches 106 of the two adjacent fiber optic connectors 100 may be placed in close proximity, such as facing side by side, to each other in the space 614. Thus, the dimension 606 between the latches 106 of the connectors 100 with different polarities, as shown in FIG. 6B, is relatively narrower than the dimension 605 between the latches 106 of the fiber optic connector and the cable 122 of the neighboring fiber optic connector 100, as shown in FIG. 6A. By utilizing the non-uniform dimensions of the space 614 formed from the curved support plate 502, the relatively wider dimension 612 between the cables 122 of the fiber optic connectors 100 may be obtained in an end part 615 of fiber optic connectors 100, thus allowing an easy finger access from the operators to manage the fiber optic connectors 100 disposed in the curved support plate 502.

FIGS. 7A-7C depict the fiber optic panel assembly 500 in different configurations. For example, in the example depicted in FIG. 7A, the curved support plate 502 is placed in the fiber optic panel assembly 500 with the plurality of adaptors 200 disposed therein, readily to receive respective fiber optic connectors 100 to be coupled thereto. The fiber optic panel assembly 500 includes a ceiling cover 598, a bottom cover 596 and side panels 591 defining an interior opening 597 to receive the curved support plate 502 disposed therein. A front cover 580, which may also be one of the side panels, of the fiber optic panel assembly 500 is maintained in a closed status so that the curved support plate 502 is remained in the fiber optic panel assembly 500 in a non-extended position. In one example, the curved support plate 502 may include multiple trays 702a, 702b, 702c, forming slidable trays that may be pulled or slid out to an extended position. A corresponding rail 704a, 704b, 704c may be disposed in the fiber optic panel assembly 500 configured to be mated and assembled with the multiple trays 702a, 702b, 702c of the curved support plate 502, providing the individually and relatively slidable movements to each of the trays 702a, 702b, 702c formed in the curved support plate 502. For example, in the example depicted in FIG. 7B, the second tray 702b of the curved support plate 502 is slid and pulled out for easy cable inspection and management. The front door 580 may also be in the opened status to allow the second tray 702b of the curved support plate 502 to be in the extended position. When installation of the fiber optic connectors 100 are completed and placed in the desired ports of the adaptors 200 in the curved support plate 502, as shown in FIG. 7C, the multiple trays 702a, 702b, 702c along with the corresponding rails 704a, 704b, 704c may be pushed back in the un-extended position and the front door 580 may then be returned to the closed status.

Figure 8:
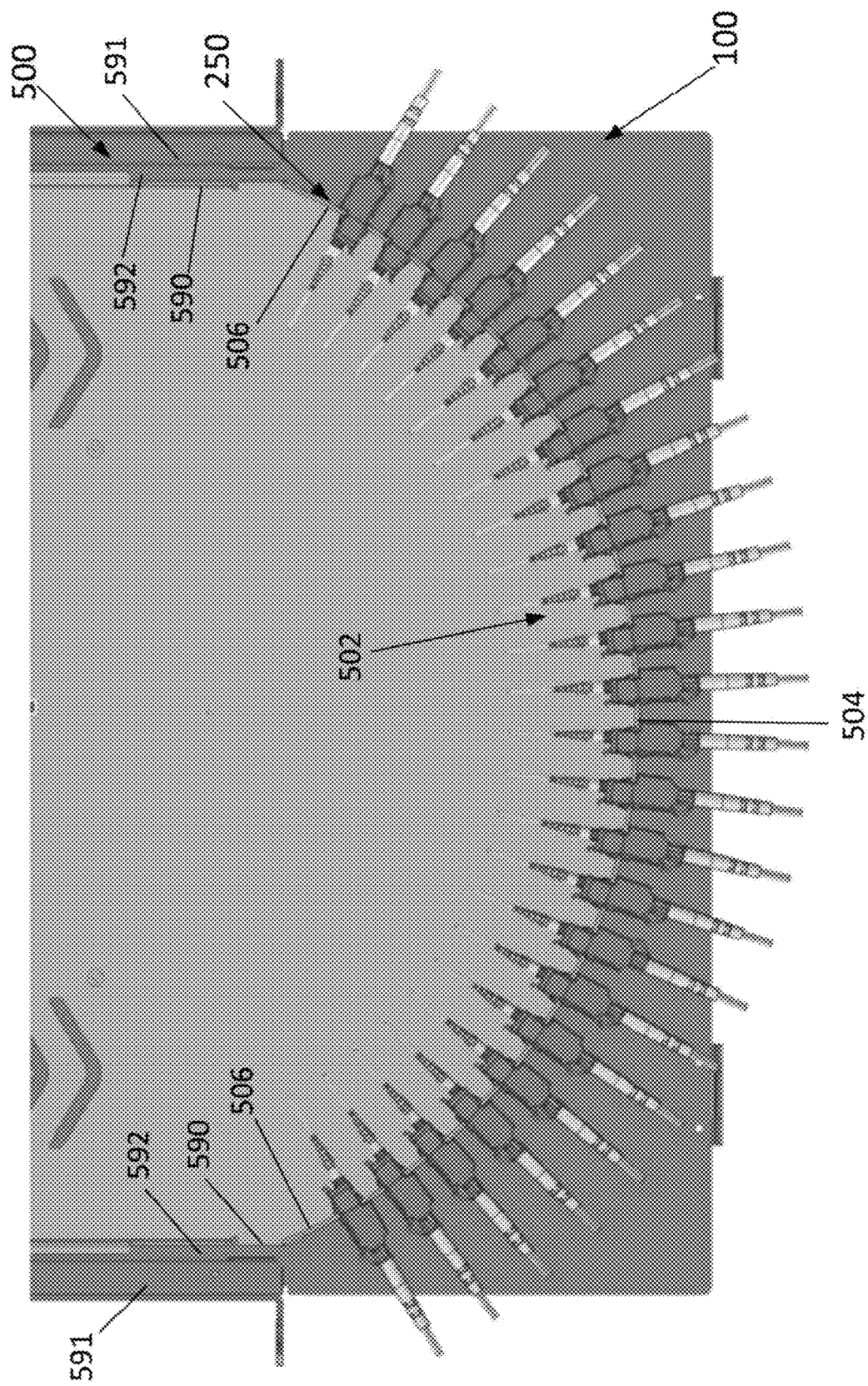
FIG. 8 depicts a top view of another example of the fiber optic panel assembly of FIG. 5 according to aspects of the disclosure.

FIG. 8 depicts a top view of the fiber optic panel assembly 500 that has the curved support plate 502 disposed therein. In one example, the curved support plate 502 includes a flange 590 in connection with the edge portion 506 of the curved support plate 502. The flange 590 may be coupled to a mounting structure 592 disposed on side panels 591 of the fiber optic panel assembly 500 that can assist mounting the patch panel assembly 500 to a cable management system, such as a cable rack located in the server room or a data center. The flange 590 may be mounted to the mounting structure 592 by fastening features, such as bolts and nuts, screw fasteners and the like.

Figure 9B:
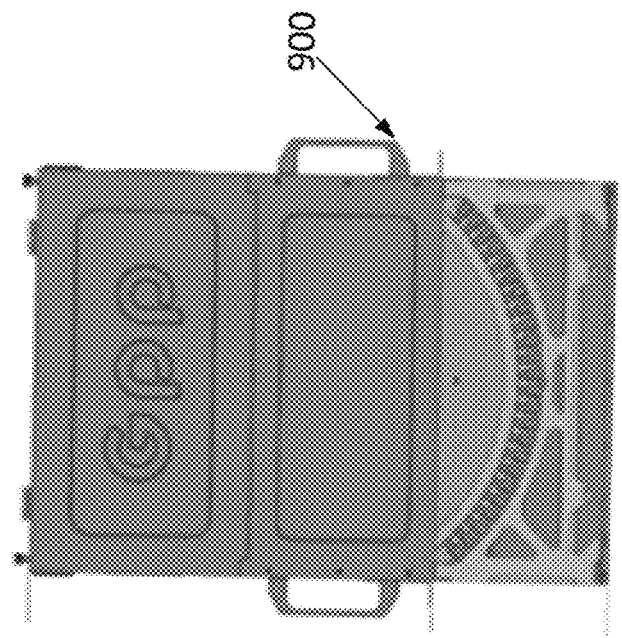
FIGS. 9A-9C depict a perspective view, a top view, and a side view, respectively, of a high-density fiber optic panel assembly according to aspects of the disclosure.
Figure 9A:
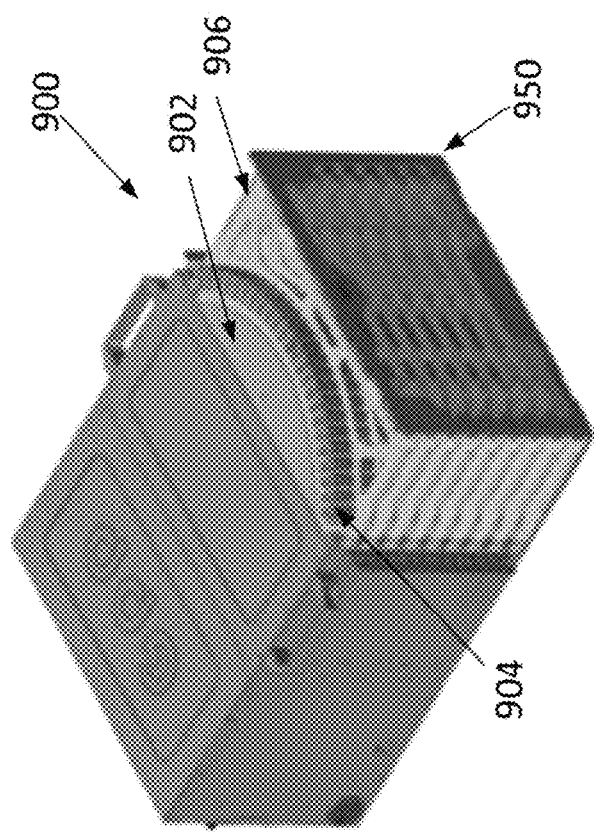
Figure 9C:
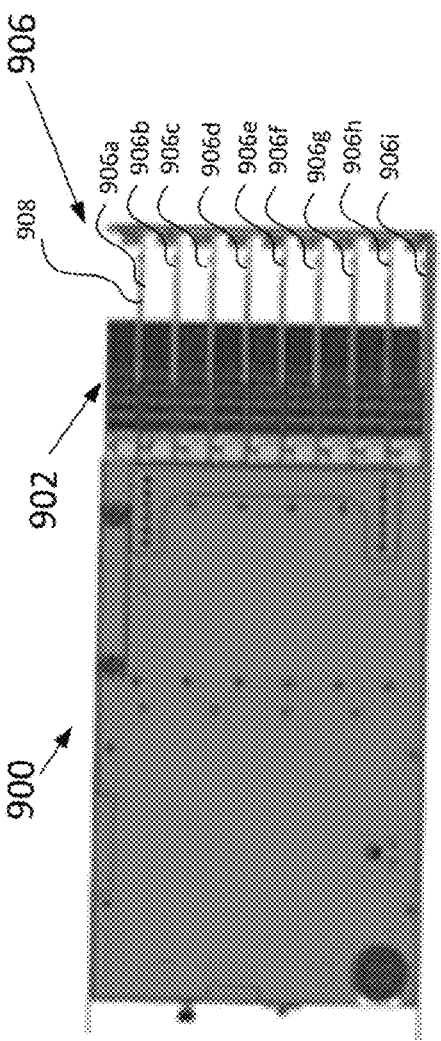

FIGS. 9A-9C depict a perspective view, a top view, and a side view, respectively, of a high-density fiber optic panel assembly 900 according to aspects of the disclosure. In the example depicted in FIGS. 9A-9C, the high-density fiber optic panel assembly 900 includes a curved support plate 902 having multiple trays 904 formed therein. Each tray 904 may be coupled to a corresponding rail 906 so as to facilitate movement of the different trays 904 of the curved support plate 902 between a non-extended position to an extended position. In the example depicted in FIG. 9A-9C, the curved support plate 902 is in a non-extended position with the front door 950 in a closed status. The numbers of the trays of curved support plate 902 may be varied to accommodate multiple trays or tiers of the adaptors or adaptor modules disposed therein to receive multiple fiber optic connectors. In one example, the curved support plate 902 has about nine trays, each coupling to a corresponding rail 906a-906i disposed in the fiber optic panel assembly 900, as shown in FIG. 9C. Each rail 906a-906i may have a bottom tray 908 to provide a gripping structure to facilitate pulling, sliding and moving of the trays of the curved support plate 902 coupled to the corresponding rails 906a-906i. The rails 906a-906i may be in any number based on the numbers of the trays formed in the curved support plate 902 for different requirements of the quantities of the fiber optic connectors to be connected to the fiber optic panel assembly 900.

FIGS. 10A-10B depict another example of a fiber optic panel assembly 1000 with slidable trays 1002. In the example depicted FIGS. 10A-10B, the adaptor modules 1003 may be placed in a vertical side by side configuration. The adaptor modules 1003 may or may not be disposed in a staggered configuration or in a curved support plate for the flare-out configuration. The adaptor modules 1003 may be divided into different tiers 1004a, 1004b, 1004c stacked in a vertical fashion. The fiber optic panel assembly 1000 may include a plurality of slots or rails for receiving corresponding trays 1002a, 1002b, 1002c. Each tray 1002a, 1002b, 1002c may control and facilitate individual movement of a corresponding tier 1004a, 1004b, 1004c of the adaptor modules 1003 relative to a neighboring tier. For example, a first tray 1002a may support a first tier 1004a of adaptor modules, and the first tray 1002a may extend or slide into or out of the fiber optic panel assembly 1000 without moving trays 1002b, 1002c, etc. carrying corresponding tiers 1004b, 1004c, etc. Similar relative movement is possible for each of the other trays as well. As depicted in the example of FIG. 10B, the second tier 1002b of the adaptor modules 1003 disposed on the tray 1002b is pulled out in an extended position with the front door 1050 opened.

Figure 11B:
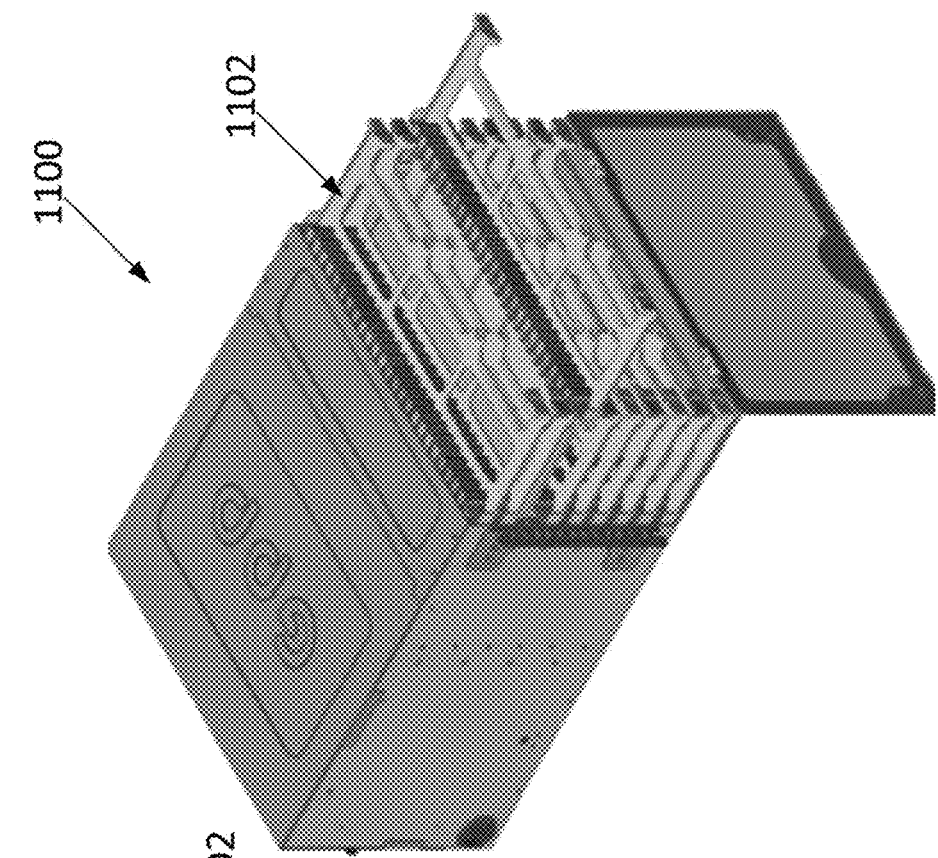
FIGS. 11A-11B depict yet another example of a high-density fiber optic panel assembly with slidable trays according to aspects of the disclosure.
Figure 11A:
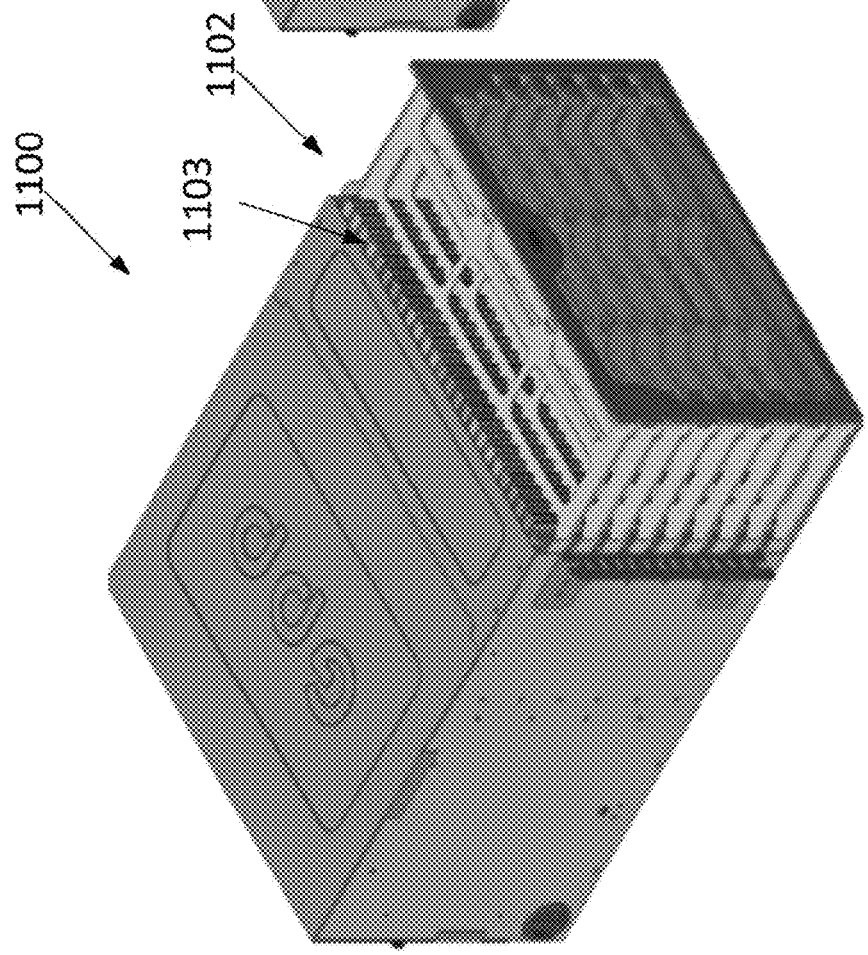

FIGS. 11A-11B depict yet another example of a high-density fiber optic panel assembly 1100 with slidable trays 1102 according to aspects of the disclosure. In this example, nine slidable trays 1102 are formed in the high-density fiber optic panel assembly 1100 to provide individual movement to each of the trays wherein the plurality of the adaptor modules 1103 are disposed. It is noted that the configurations of the adaptor modules 1003 with multiple tiers in connection with different corresponding trays, individual movement and pull-out of the adaptor modules may be obtained to facilitate cable inspection and arrangement for the operator, thus enhancing the cable maintenance and installation efficiency.

Thus, a fiber optic panel assembly that has a sliding tray disposed therein that can slide out certain selected fiber optic modules outward from other non-selected fiber optic modules in a vertical fashion is provided. The curved support plate included in the fiber optic panel assembly may support the adaptor modules in positions spaced apart from each other, thus providing sufficient spaces among the fiber optic connectors that allow finger access for operators or technicians. Furthermore, by utilizing the curved support plate in the fiber optic panel assembly, multiple arrays of adaptor modules may be placed side by side, both horizontally and vertically, in the curved support plate in a closely packed arrangement, thus efficiently utilizing the space in the fiber optic panel assembly to enhance the capacity of the adaptor modules that may be carried in the panel assembly. In addition, the curved support plate may include multiple slidable trays disposed in a vertical fashion so that each tray may be individually pulled out in an extended position for ease of cable inspection and management.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A fiber optic panel assembly, comprising:
    a curved support plate having a front surface with a convex configuration having a radius of curvature; and
    a plurality of apertures within the curved support plate, wherein each aperture of the plurality of apertures is configured to receive a respective adaptor,
    wherein each aperture of the plurality of apertures forms a plane tangential to the front surface, and
    wherein each aperture of the plurality of apertures is positioned such that an axis running through a respective aperture in a direction perpendicular to the tangential plane of the respective aperture forms an acute angle with another axis running through an adjacent aperture in a direction perpendicular to the tangential plane of the adjacent aperture.

2. The fiber optic panel assembly of claim 1, wherein the curved support plate has a rear surface formed opposite the front surface, the rear surface having a concave configuration.

3. The fiber optic panel assembly of claim 1, wherein the radius of curvature is in a range between about 150 mm and about 280 mm.

4. The fiber optic panel assembly of claim 1, further comprising:
    a panel assembly including a ceiling, a bottom cover, and two opposing side panels defining an interior opening; and
    one or more trays which are positionable within the panel assembly.

5. The fiber optic panel assembly of claim 4, wherein each tray of the one or more trays is individually slidable relative to a neighboring tray.

6. The fiber optic panel assembly of claim 4, wherein the curved support plate further comprises:
    a first edge and a second edge opposite the first edge, and
    a first flange of a pair of flanges attached to the first edge and a second flange of the pair of flanges attached to the second edge, and
    wherein each of the first flange and the second flange is removably mounted to a respective one of the two opposing panels.

7. The fiber optic panel assembly of claim 6, wherein
    a center portion is formed between the first edge and the second edge, the center portion having a linear length in a range between about 350 mm and about 550 mm.

8. The fiber optic panel assembly of claim 7, wherein the linear length has a center point having a distance in a range between about 50 mm and about 250 mm to the center portion.

9. The fiber optic panel assembly of claim 1, wherein each of the adaptors are configured to be disposed in the curved support plate in vertical arrays placed side by side against each other.

10. The fiber optic panel assembly of claim 9, wherein each array of the adaptors defines a longitudinally vertical plane forming an acute angle relative to another longitudinally vertical plane defined by an adjacent array of the adaptors.

11. The fiber optic panel assembly of claim 10, wherein the acute angle is in a range between approximately 1 degree and approximately 40 degrees.

12. The fiber optic panel assembly of claim 1, wherein each of the adaptors is configured to receive a respective dual polarity fiber optic connector.

13. The fiber optic panel assembly of claim 1, further comprising an openable front cover.

14. The fiber optic panel assembly of claim 13, wherein the front cover is in an open position when the curved support plate is in an extended position.

* * * * *